US011050796B2

(12) United States Patent
Afzal et al.

(10) Patent No.: US 11,050,796 B2
(45) Date of Patent: Jun. 29, 2021

(54) INTERFACE SESSION DISCOVERY WITHIN WIRELESS COMMUNICATION NETWORKS

(71) Applicant: T-Mobile USA, Inc., Bellevue, WA (US)

(72) Inventors: Muhammad Waqar Afzal, Bellevue, WA (US); Shujaur Mufti, Snoqualmie, WA (US); Karunakalage Viraj Rakitha Silva, Renton, WA (US); Saad Hamid, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 176 days.

(21) Appl. No.: 16/252,192

(22) Filed: Jan. 18, 2019

(65) Prior Publication Data

US 2020/0236148 A1     Jul. 23, 2020

(51) Int. Cl.
| | | |
|---|---|---|
| *H04L 29/06* | (2006.01) | |
| *H04L 12/14* | (2006.01) | |
| *H04W 92/24* | (2009.01) | |
| *H04W 92/02* | (2009.01) | |

(52) U.S. Cl.
CPC ...... *H04L 65/1016* (2013.01); *H04L 12/1407* (2013.01); *H04L 65/105* (2013.01); *H04L 65/1036* (2013.01); *H04L 65/1073* (2013.01); *H04W 92/02* (2013.01); *H04W 92/24* (2013.01)

(58) Field of Classification Search
CPC ............. H04L 12/1407; H04L 65/1016; H04L 65/1036; H04L 65/105; H04L 65/1073; H04W 92/02; H04W 92/24
USPC ....................................................... 370/252
See application file for complete search history.

(56) References Cited

U.S. PATENT DOCUMENTS

| | | | |
|---|---|---|---|
| 2011/0165901 A1 | 7/2011 | Baniel et al. | |
| 2012/0102174 A1 | 4/2012 | Zhou et al. | |
| 2013/0229986 A1 | 9/2013 | Rasanen | |
| 2015/0358229 A1* | 12/2015 | Steinacker | ............. H04L 45/22 370/392 |

(Continued)

FOREIGN PATENT DOCUMENTS

KR         20150027356         3/2015

OTHER PUBLICATIONS

The PCT Search Report and Written Opinion dated Apr. 29, 2020 for PCT Application No. PCT/US2020/012671, 10 pages.

*Primary Examiner* — Omar J Ghowrwal
*Assistant Examiner* — Kokou R Detse
(74) *Attorney, Agent, or Firm* — Lee & Hayes, P.C.

(57) ABSTRACT

A method for discovering an interface session within a wireless communication network is discussed herein. The method includes establishing an Internet Protocol (IP) packet-switched network registration between a first node of a plurality of nodes within the wireless communication network and a second node of the plurality of nodes. The method further includes, requesting, by a third node of the plurality of nodes from a fourth node of the plurality of nodes, service for a call of a mobile device within the wireless communication network. Based upon not having an appropriate interface session established between the first node and the fourth node, the method also includes performing, by the fourth node, an interface session discovery. Based at least in part on the interface session discovery, a dedicated bearer is established at the second node for the call.

14 Claims, 5 Drawing Sheets

(56) References Cited

U.S. PATENT DOCUMENTS

2017/0171904 A1\* 6/2017 Wu ...................... H04W 48/02
2018/0241615 A1   8/2018 Livanos et al.
2018/0248920 A1\* 8/2018 Nomani .............. H04L 65/1016

\* cited by examiner

INTERFACE SESSION DISCOVERY WITHIN WIRELESS COMMUNICATION NETWORKS

BACKGROUND

In recent years, mobile telecommunication devices have advanced from offering simple voice calling services within wireless communication networks to providing users with many new features. Mobile telecommunication devices (also referred to herein as mobile devices and user equipment (UEs)) now provide messaging services such as email, text messaging, and instant messaging; data services such as Internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

Wireless communication networks often include multiple regions/pools for Packet Data Network (PDN) Gateway (PGW) traffic. Other nodes within the wireless communication network generally follow the same multiple region strategy. For example, Internet Protocol (IP) Multimedia Subsystem (IMS)/Proxy-Call Session Control (P-CSCF) nodes and Policy and Charging Rules Function (PCRF) nodes generally also follow the multiple region strategy. Thus, each region within a wireless communication network generally includes a PGW node, an IMS/P-CSCF node and a PCRF node. Voice over Long Term Evolution (VoLTE) and/or Video over Long Term Evolution (ViLTE) traffic should follow the same PGW, PCRF and P-CSCF nodes in the same region for successful calls. However, as wireless communication networks continue to rapidly evolve, configuration changes in wireless communication networks are inevitable. For example, major deployment of Fifth Generation (5G) technologies and protocols occurring within wireless communication networks may result in leakage in pooling of nodes within regions, e.g., one or more nodes in a region may be communicatively coupled with one or more nodes in another region. Such traffic leakage between regions and/or wireless communication technologies may cause VoLTE and/or ViLTE call and service outage.

For example, a first PGW node may be connected to a first PCRF node via a Gx interface and provide a first P-CSCF node to a mobile device for IMS registration. However, the first P-CSCF node may be communicatively coupled to a second PCRF node via a Rx interface. While IMS registration for the mobile device will be successful, during VoLTE call set up, the first P-CSCF node may send an Authentication Authorization Request (AAR) message to the second PCRF node. However, since there is no Gx interface session on the second PCRF node with respect to the first PGW node, the second PCRF node may send an Authentication Authorization Answer (AAA) message with an error code and the VoLTE call will fail.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
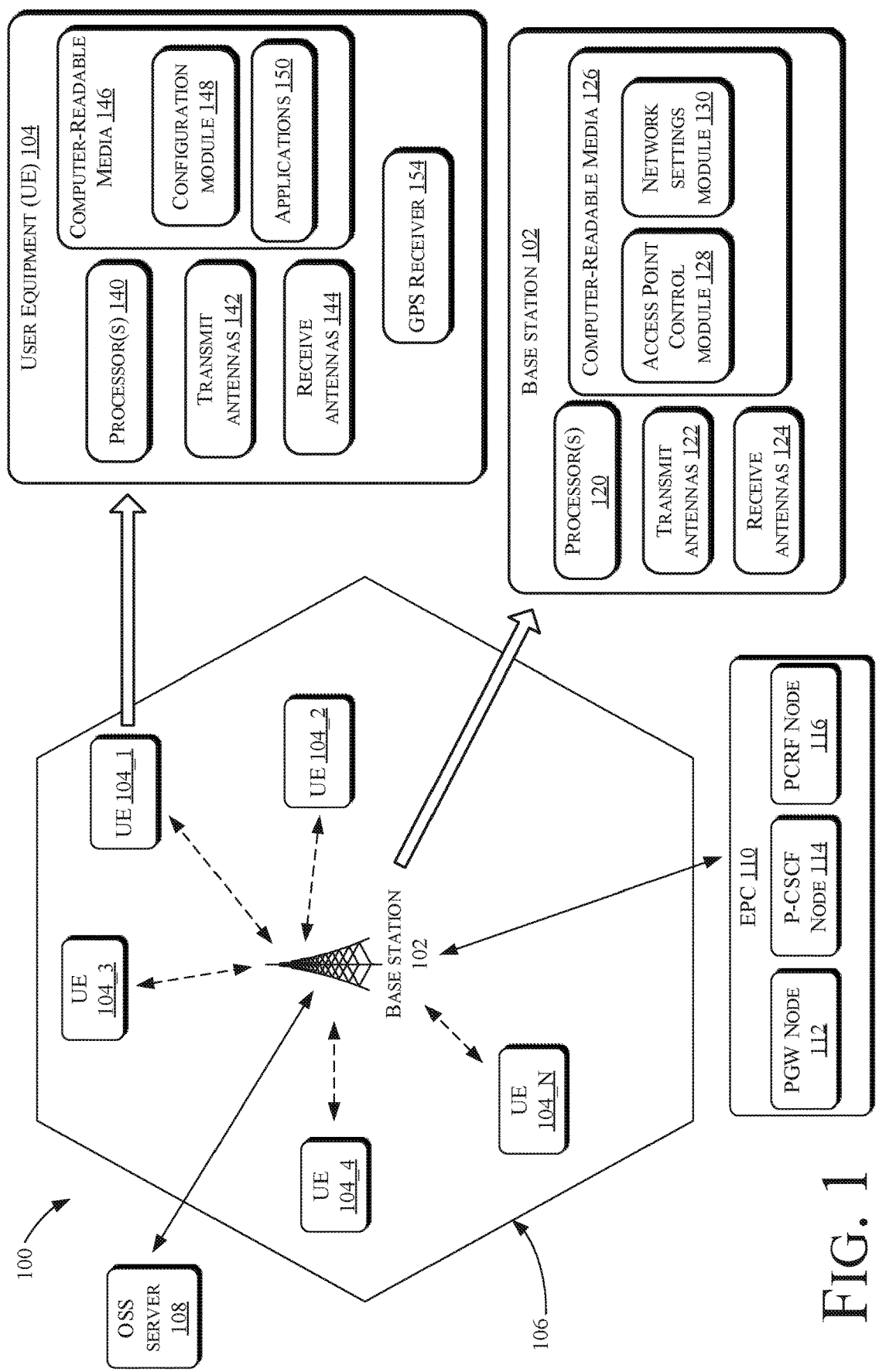
FIG. 1 schematically illustrates a macro cell of a wireless communication network, in accordance with various configurations.

Described herein are wireless communication networks that include techniques and architecture for discovering interface sessions, e.g., Gx interface sessions, within wireless communication networks. In general, the techniques and architecture allow a PCRF node within a first region of a wireless communication network to discover a Gx interface session between another PCRF node within a second region of the wireless communication network and a PGW node within the second region of the wireless communication network.

In configurations, a first region/pool of a wireless communication network includes a Packet Data Network (PDN) Gateway (PGW) node, a Proxy-Call Session Control Function (P-CSCF) node, and a first Policy and Charging Rules Function (PCRF) node. The PGW node may be communicatively coupled to the first PCRF node via a Gx interface session. As is known, a Gx interface is an on-line policy interface between the Gateway General Packet Radio Service (GPRS) Support Node (GGSN) and a Charging Rules Function (CRF) node, e.g., the first PCRF node. The Gx interface may be used for provisioning service data flow based on charging rules. The PGW node may be communicatively coupled to the P-CSCF node via a Gi interface and the P-CSCF node may be communicatively coupled to the first PCRF node via a first Rx interface. As is known, a Gi interface is an Internet Protocol (IP) based interface between the GGSN and a public data network (PDN) either directly to the Internet or through a Wireless Application Protocol (WAP) gateway and a Rx interface is used to connect third-party applications and IMS networks to implement Voice over Long Term Evolution (VoLTE) and/or Video over Long Term Evolution (ViLTE). However, with respect to at least some mobile devices within the first region of the wireless communication network, the P-CSCF node may be communicatively coupled to a second PCRF node, e.g., a PCRF node located in a different region/pool of the wireless communication network, via a second Rx interface.

The PGW node may perform an IP packet-switched network registration with the first PCRF node. For example, the PGW node may establish an IMS registration with the first PCRF node. The IMS registration may involve the PGW node sending a Create Control Request-Initial (CCR-I) message to the first PCRF node. The first PCRF node may reply with a Create Control Acknowledgement-Initial (CCA-I) message to the PGW node. This establishes an IMS registration between the PGW node and the first PCRF node.

A request from a mobile device may be received by the P-CSCF node for IMS registration of the mobile device. Because the P-CSCF node is communicatively coupled to the second PCRF node, the second PCRF node may search for a Gx interface session. The Gx interface session search may include an optional AAR inquiry from the P-CSCF node to the second PCRF node. In configurations, the Gx interface session search may include a Gx interface session discovery message sent by the second PCRF node to the first PCRF node and/or to all PCRF nodes within the wireless communication network. The first PCRF node may reply to the second PCRF node with a Gx interface session discovery successful message. The second PCRF node may respond to the P-CSCF node with an AAA message indicating that the Gx interface session has been discovered at the first PCRF node. The IMS registration between the P-CSCF node and the mobile device is now successful.

In configurations, the Gx interface session search may be in response to the successful IMS registration between the PGW node and the first PCRF node. In such configurations, the Gx interface session search may include an optional AAR inquiry from the P-CSCF node to the second PCRF node. In configurations, the Gx interface session search may include a Gx interface session discovery message sent by the second PCRF node to the first PCRF node and/or to all PCRF nodes within the wireless communication network over a newly defined S9 interface. The first PCRF node may reply to the second PCRF node with a Gx interface session discovery successful message. The second PCRF node may respond to the P-CSCF node with an AAA message indicating that the Gx interface session has been discovered at the first PCRF node. The mobile device may obtain IMS registration with the P-CSCF node after the successful Gx interface session discovery.

Once the IMS registration between the mobile device and the first P-CSCF node is successful, the mobile device may wish to place a call, e.g., a Voice over Long Term Evolution (VoLTE) call, or a video call, e.g., Video over Long Term Evolution (ViLTE) call, using the IMS. The P-CSCF node may send an AAR message to the second PCRF node requesting service for the call, e.g., to create a dedicated bearer for the call at the second PCRF node.

The second PCRF node may forward the AAR message to the first PCRF node, e.g., a first home PCRF node, over the newly defined S9a interface due to the Gx interface session discovery by the second PCRF node, e.g., a second home PCRF node. In response to receiving the forwarded AAR message, the first PCRF node may forward a Reauthorization Request (RAR) message to the PGW node requesting the PGW node create a dedicated bearer at the first PCRF node for the call. The first PCRF node may forward an AAA message to the second PCRF node indicating that the PGW node has created a dedicated bearer for the call at the first PCRF node. The second PCRF node may forward the received AAA message to the P-CSCF node informing the P-CSCF node that the first PCRF node is the dedicated bearer for the call. Thus, going forward, establishing VoLTE calls and/or ViLTE calls from the P-CSCF node to the second PCRF node may be handled by the second PCRF node forwarding such requests for VoLTE and/or ViLTE calls to the first PCRF node via the S9a interface.

In configurations, the Gx interface session discovery may be performed in response to a request from a mobile device for a VoLTE call and/or a ViLTE call as opposed to proactively during IMS registration of the mobile device with the P-CSCF node. In such a configuration, when the mobile device requests service for a VoLTE call and/or a ViLTE call, the second PCRF node may send the Gx interface session discovery message to other PCRF nodes, including the first PCRF node, in different regions of the wireless communication network. The first PCRF node may then respond to the second PCRF node with a Gx interface session discovery successful message and the second PCRF node may respond to the P-CSCF node with an AAA message indicating the successful discovery of the Gx interface session at the first PCRF node. The first PCRF node may send the RAR message to the PGW node to create the dedicated bearer at the first PCRF node as previously described. The first PCRF node may send a successful response (e.g., an AAA message) to the second PCRF node that may then be forwarded as an AAA message back to the P-CSCF node as previously described.

FIG. 1 illustrates an example wireless communication network 100 (also referred to herein as network 100). The network 100 comprises a base station (BS) 102 communicatively coupled to a plurality of user devices or user equipment, referred to as user equipment (UE) 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102. In configurations, the macro cells 106 may be divided into small cells (not illustrated), e.g., femto cells, pico cells, micro cells, or the like. The multiple macro cells 106 and small cells may be organized into multiple subnetworks that make up the wireless communication network 100. For example, the wireless communication network 100 may be a national network and, thus, the wireless communication network 100 may be divided into four regional subnetworks, where each regional subnetwork includes multiple macro cells 106 that may be divided into small cells.

In a configuration, the UEs 104_1, . . . , 104_N may comprise any appropriate devices, e.g., stationary devices, portable electronic devices, or mobile devices, for communicating over a wireless communication network. Such devices include mobile telephones, cellular telephones, IP telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded Global Positioning System (GPS) receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In a configuration, the BS 102 may communicate voice traffic and/or data traffic with one or more of the UEs 104_1, . . . , 104_N using RF signals. The BS 102 may communicate with the UEs 104_1, 104_N using one or more appropriate wireless communication protocols or standards. For example, the BS 102 may communicate with the UEs 104_1, 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi™ protocols (including IEEE 802.11 protocols), WiMAX™ protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an operation support subsystem (OSS) server 108, an Evolved Packet Core (EPC) 110 that serves as a gateway when the wireless communication network 100 operates according to the LTE standard, LTE Advanced standard, 5G, etc., and/or the like. The EPC 110 can also be in the form of a radio network controller (RNC) when the wireless communication network 100 operates according to a different standard or protocol. The EPC 110 may comprise multiple nodes, e.g., a Packet Data Network (PDN) Gateway (PGW) node 112, a Proxy-Call Session Control Function (P-CSCF) node 114, and a Policy and Charging Rules Function (PCRF) node 116. In configurations, the wireless communication network 100 may be divided into multiple regions or pools. The division may be based on, for example, geography and/or wireless traffic. Each region of the wireless communication network 100 includes its own EPC 110. Thus, if, for example, the wireless communication network includes six regions, then the wireless communication network 100 includes six corresponding EPCs 110.

In a configuration, the base station 102 may comprise processor(s) 120, one or more transmit antennas (transmitters) 122, one or more receive antennas (receivers) 124, and computer-readable media 126. The processor(s) 120 may be configured to execute instructions, which may be stored in the computer-readable media 126 or in other computer-readable media accessible to the processor(s) 120. In some configurations, the processor(s) 120 are a central processing unit (CPU), a graphics processing unit (GPU), or both CPU and GPU, or any other sort of processing unit. The base station 102 can also be in the form of, for example, a Node B (where the wireless communication network 100 is 3G UMTS network), in the form of an eNode B (where the wireless communication network 100 operates according to the LTE standard or LTE Advanced standard), in the form of a gNodeB (where the wireless communication network 100 operates according to the 5G standard), etc.

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In a configuration, the antennas 122 and 124 may be included in a transceiver component of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disc read-only memory ("CD-ROM"), digital versatile discs ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processor(s) 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other configurations, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In a configuration, the UEs 104 may comprise processor(s) 140, one or more transmit antennas (transmitters) 142, one or more receive antennas (receivers) 144, and computer-readable media 146 in the form of memory and/or cache. The processor(s) 140 may be configured to execute instructions, which may be stored in the computer-readable media 146 or in other computer-readable media accessible to the processor(s) 140. In some configurations, the processor(s) 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In a configuration, the antennas 142 and 144 may be included in a transceiver component of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 104.

The computer-readable media 146 may store several modules, such as instructions, data stores, and so forth that are configured to execute on the processor(s) 140. For instance, the computer-readable media 146 may store a configuration module 148. In configurations, the computer-readable media 146 may also store one or more applications 150 configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.). The applications 150 may also include third-party applications that provide additional functionality to the UE 104. In configurations, the UE 104 may also comprise a GPS receiver 154 and/or another location determination component.

Although not illustrated in FIG. 1, the UEs 104 may also comprise various other components, e.g., a battery, a charging unit, one or more network interfaces, an audio interface, a display, a keypad or keyboard, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processor(s), one or more transmit antennas, one or more receive antennas, and computer-readable media including a configuration module.

In a configuration, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (TTI) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In a configuration, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 2:
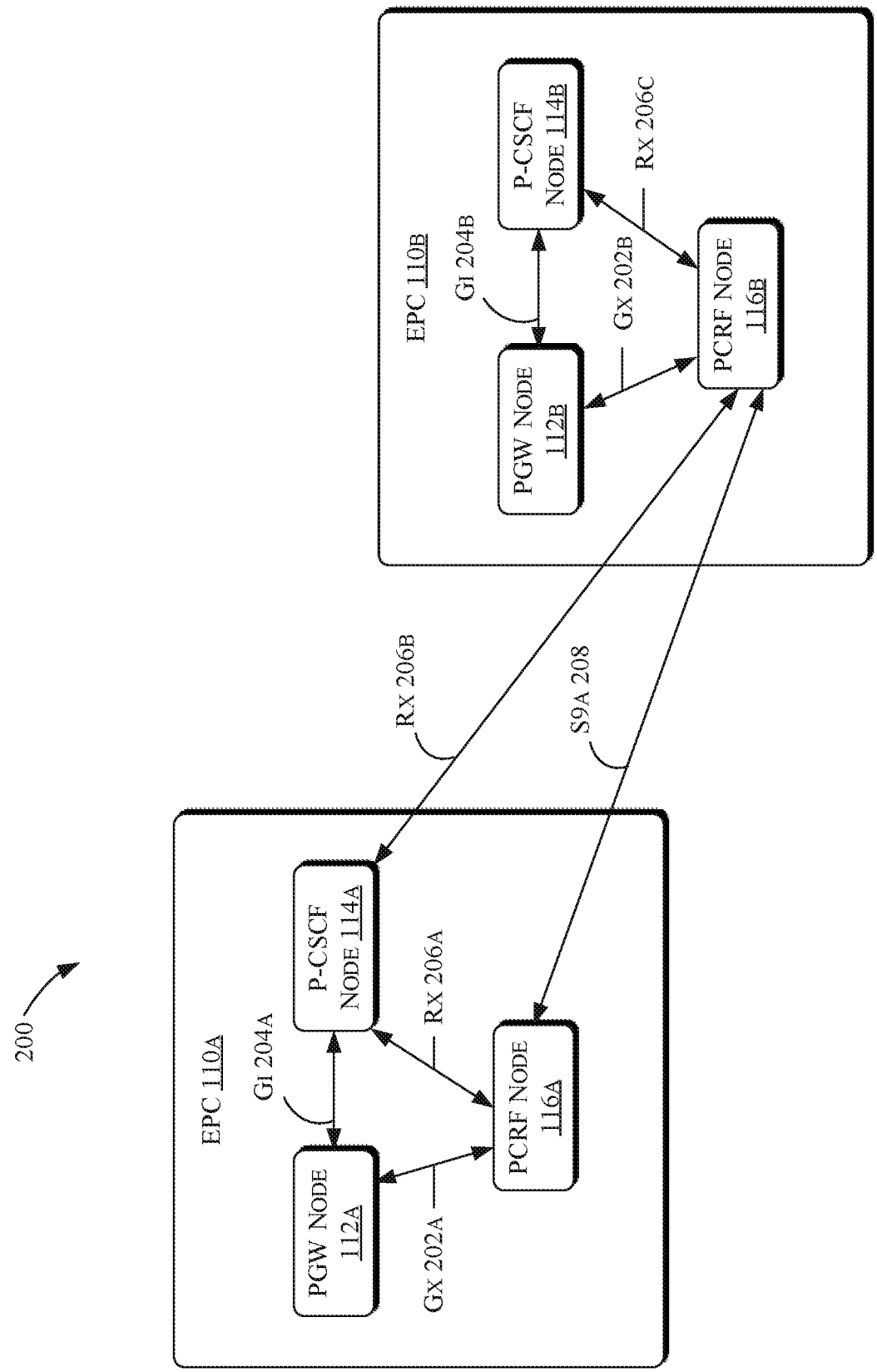
FIG. 2 schematically illustrates an arrangement of two EPCs of the wireless communication network of FIG. 1, in accordance with various configurations.

FIG. 2 schematically illustrates an arrangement 200 of two EPCs 110a, 110b of the wireless communication network 100 of FIG. 1. In configurations, the first EPC 110a may correspond to a first region of the wireless communication network 100, while the second EPC 110b may correspond to a second region of the wireless communication network 100. The wireless communication network 100 may include more than two regions and thus, may include more than two EPCs 110, each EPC 110 corresponding to a particular region of the wireless communication network 100.

The first EPC 110a includes a first PGW node 112a, a first P-CSCF node 114a and a first PCRF node 116a, which may serve, in configurations, as a first home PCRF node. The second EPC 110b includes a second PGW node 112b, a second P-CSCF node 114b and a second PCRF node 116b, which may serve, in configurations, as a second home PCRF node. The EPCs 110 generally include more nodes but only the PGW node 112, the P-CSCF node 114 and the PCRF node 116 are illustrated for clarity.

As previously noted, Voice over Long Term Evolution (VoLTE) traffic, e.g., calls, and/or Video over Long Term Evolution (ViLTE) traffic, e.g., calls should follow the same PGW, PCRF and P-CSCF nodes in the same region for successful calls. However, as wireless communication networks such as wireless communication network 100 continue to rapidly evolve, configuration changes in wireless communication networks such as wireless communication network 100 are inevitable. Such configuration changes within wireless communication network 100 may result in leakage in pooling of EPC nodes within regions, e.g., one or more nodes in an EPC 110 of a region of the wireless communication network 100 may be communicatively coupled with one or more nodes in another region of the wireless communication network 100. Such traffic leakage between regions and/or wireless communication technologies may cause VoLTE and/or ViLTE call and service outage.

For example, as may be seen in FIG. 2, the PGW node 112a may be communicatively coupled to the PCRF node 116a via a Gx interface session 202a. The PGW node 112a may be communicatively coupled to the P-CSCF node 114a via a Gi interface 204a and the P-CSCF node 114a may be communicatively coupled to the PCRF node 116a via a Rx interface 206a. However, with respect to at least some UEs 104 within the first region of the wireless communication network 100, the P-CSCF node 114a may be communicatively coupled to the PCRF node 116b of the second region of the wireless communication network 100 via a second Rx interface 206b. The PGW node 112b may be communicatively coupled to the PCRF node 116b via a Gx interface session 202b. The PGW node 112b may be communicatively coupled to the P-CSCF node 114b via a Gi interface 204b and the P-CSCF node 114b may be communicatively coupled to the PCRF node 116b via a Rx interface 206c. The PCRF nodes 116 may be communicatively coupled to other PCRF nodes 116 via newly defined S9a interfaces 208 for communicatively coupling home PCRF nodes.

Figure 3:
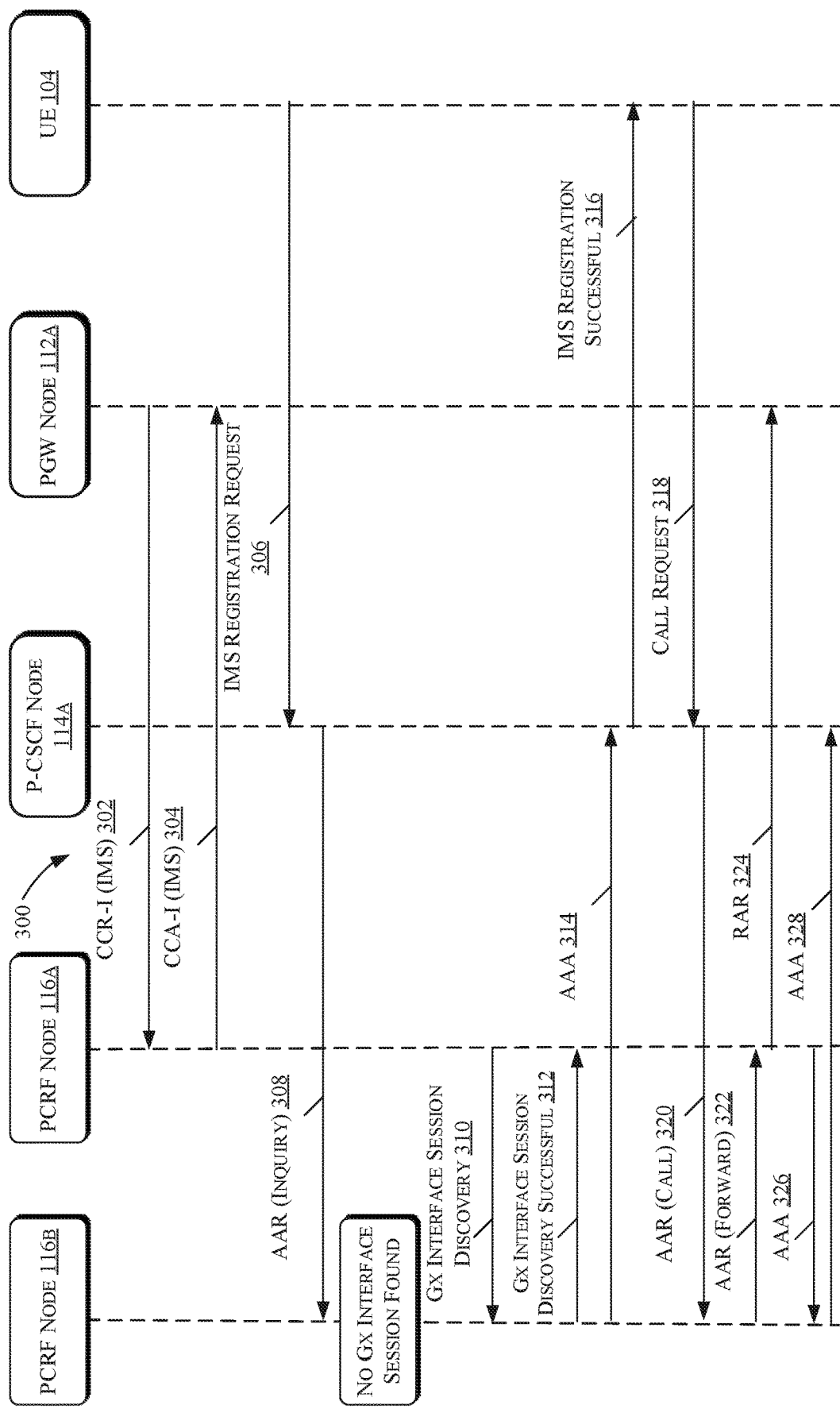
FIG. 3 is a flow diagram illustrating an example call flow sequence for discovering a Gx interface session within the wireless communication network of FIG. 1 when a P-CSCF node of an EPC is not properly communicatively coupled to a corresponding PCRF node of the EPC, in accordance with various configurations.

FIG. 3 is a flow diagram illustrating an example call flow sequence 300 for discovering a Gx interface session 202 within the wireless communication network 100 when a P-CSCF node 114 of an EPC 110 is not properly communicatively coupled to a corresponding PCRF node 116 of the EPC 110. The PGW node 112a may perform an IP packet-switched network registration with the PCRF node 116a. For example, the PGW node 112a may establish an IMS registration, and thereby the Gx interface session 202a, with the PCRF node 116a. In configurations, the IMS registration may involve, at a first step 302, the PGW node 112a sending a Create Control Request-Initial (CCR-I) message to the PCRF node 116a. At a second step 304, the PCRF node 116a may reply with a Create Control Acknowledgement-Initial (CCA-I) message to the PGW node 112a. This establishes an IMS registration between the PGW node 112a and the PCRF node 116a via the first Gx interface session 202a.

At step 306, a request from a UE_104 may be received by the P-CSCF node 114a for IMS registration of the UE_104. Because the P-CSCF node 114a is communicatively coupled to the PCRF node 116b, the second PCRF node 116b searches for a correct Gx interface session 202. In configurations, the Gx interface session search may include, at step 208, an Authentication Authorization Request (AAR) inquiry from the P-CSCF node 114a to the PCRF node 116b. No Gx interface session is found between the PCRF node 116b and the PGW node 112a. Thus, at step 310, the Gx interface session search may include a Gx interface session discovery message sent by the PCRF node 116b to the PCRF node 116a (and/or to all PCRF nodes within the wireless communication network 100) via S9a interface 208. At step 312, the PCRF node 116a may reply to the PCRF node 116b with a Gx interface session discovery successful message. The PCRF node 116b may respond to the P-CSCF node 114a, at step 314, with an Authentication Authorization Answer (AAA) message indicating that the Gx interface session 202a has been discovered at the PCRF node 116a. At step 316, the IMS registration between the P-CSCF node 114a and the UE_104 is now successful.

In configurations, the Gx interface session search may be in response to the successful IMS registration between the PGW node 112a and the PCRF node 116a prior to the IMS registration of the UE_104. In such configurations, steps 308-314 may be implemented prior to the IMS registration between the P-CSCF node 114a and the UE_104. Thus, the Gx interface session search may include the AAR inquiry from the P-CSCF node 114a to the PCRF node 116b. The Gx interface session search may include a Gx interface session discovery message sent by the PCRF node 116b to the PCRF node 116a (and/or to all PCRF nodes within the wireless communication network) via S9a interface 208. The PCRF node 116a may reply to the PCRF node 116a with a Gx interface session discovery successful message. The PCRF node 116b may respond to the P-CSCF node 114a with an AAA message indicating that the Gx interface session 202a has been discovered at the PCRF node 116a. The UE_104 may obtain IMS registration with the P-CSCF node 114a after the successful Gx interface session discovery, e.g. steps 306 and 316 may be implemented.

At step 318, once the IMS registration between the UE_104 and the P-CSCF node 114a is successful, the UE_104 may wish to place a call (or receive a call), e.g., a VoLTE call or a ViLTE call, using the IMS. At step 320, the P-CSCF node 114a may send an AAR message to the PCRF node 116b requesting service for the call, e.g., to create a dedicated bearer for the call at the PCRF node 116b.

At step 322, the PCRF node 116b may forward the AAR message to the PCRF node 116a over the S9a interface 208 due to the successful Gx interface session discovery by the PCRF node 116b. In response to receiving the forwarded AAR message, at step 324 the PCRF node 116a may forward a Reauthorization Request (RAR) message to the PGW node 112a requesting the PGW node 112a create a dedicated bearer at the PCRF node 116a for the call. At step 326, the PCRF node 116a may forward an AAA message to the PCRF node 116b indicating that the PGW node 112a has created a dedicated bearer for the call at the PCRF node 116a. At step 328, the PCRF node 116b may forward the received AAA message to the P-CSCF node 114a informing the P-CSCF node 114a that the PCRF node 116a is the dedicated bearer for the call.

Thus, going forward, establishing VoLTE calls and/or ViLTE calls from the P-CSCF node 114a to the PCRF node 116b due to leakage may be handled by the PCRF node 116b forwarding such requests for VoLTE and/or ViLTE calls to the PCRF node 116a via the S9a interface.

In configurations, the Gx interface session discovery, e.g., steps 310-314, may be performed in response to a request from a UE_104 for a VoLTE call and/or a ViLTE call (e.g., in response to step 318) as opposed to proactively during IMS registration of the UE_104 with the P-CSCF node 114a. In such a configuration, the UE_104 may register for IMS with the P-CSCF 114a. When the UE_104 wants to place a call (or receive a call), the P-CSCF 114a requests service for a VoLTE call and/or a ViLTE call at step 320. The PCRF node 116b may perform step 310 and send the Gx interface session discovery message to other PCRF nodes 116, including the PCRF node 116a, in different regions of the wireless communication network 100. At step 312, the PCRF node 116a may then respond to the PCRF node 116b with a Gx interface session discovery successful message and at step 314 the PCRF node 116b may respond to the P-CSCF node 114a with an AAA message indicating the successful discovery of the Gx interface session 202a at the PCRF node 116b. The call flow sequence 300 may then proceed with steps 322-328 as previously described.

Figure 4:
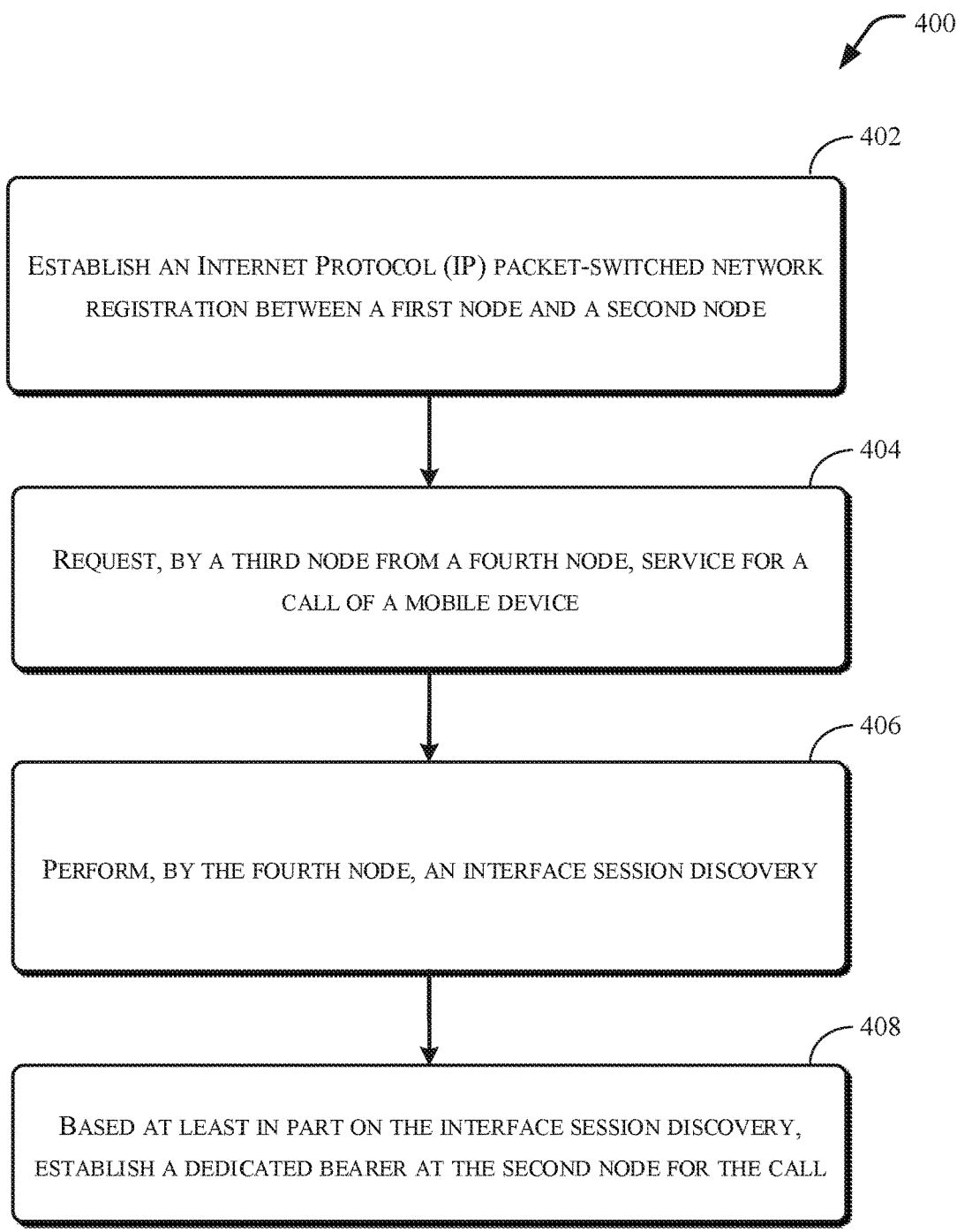
FIG. 4 is a flow diagram illustrating an example method for discovering an interface session within the wireless communication network of FIG. 1 when a node of the wireless communication network is not properly communicatively coupled to a corresponding node of the wireless communication for providing call services to mobile devices within the wireless communication network, in accordance with various configurations.

FIG. 4 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 4 is a flow diagram illustrating method 400 for discovering an interface session, e.g., a Gx interface session 202, within the wireless communication network 100 when a node of the wireless communication network, e.g., P-CSCF node 114a of an EPC 110, is not properly communicatively coupled to a corresponding node of the wireless communication, e.g., PCRF node 116a of the EPC 110, for providing call services to mobile devices within the wireless communication network 100, e.g., VoLTE calls and/or ViLTE calls for UEs 104. As illustrated, at block 402, an Internet Protocol (IP) packet-switched network registration between a first node of a plurality of nodes of the wireless communication network and a second node of the plurality of nodes may be established. For example, an IMS registration may be established between a PGW node 112a of a first EPC 110a and a PCRF node 116a of the first EPC 110a. At block 404, service for a call of a mobile device within the wireless communication network is requested by a third node of the plurality of nodes from a fourth node of the plurality of nodes. For example, a P-CSCF node 114a of the first EPC 110a may request service for a call for a UE_104 from a PCRF node 116b of a second EPC 110b.

At block 406, an interface session discovery may be performed by the fourth node. For example, the PCRF node 116b may perform a Gx interface session discovery due to a lack of a Gx interface session between the PGW node 112a and the PCRF node 116b. For the Gx interface session discovery, the PCRF node 116b may send a Gx interface session discovery message to the PCRF node 116a and/or to all PCRF nodes in the wireless communication network 100. The PCRF node 116a may then reply to the PCRF node 116b with a Gx interface session discovery successful message. At block 408, based at least in part on the interface session discovery, a dedicated bearer at the second node may be established for the call. For example, based at least in part of the PCRF node 116b discovering the Gx interface session between the PGW node 112a and the PCRF node 116a, the PGW node 112a may create a dedicated bearer for the call at the PCRF node 116a.

Thus, the interface session discovery, e.g., Gx interface session discovery, in accordance with configurations described herein, enables the EPCs 110 of the wireless communication network 100 to dynamically fix leakage issues among multiple PCRF nodes without intervention. An operator of the wireless communication network 100 may monitor wireless traffic and key performance indicators (KPIs) on the S9a interface between PCRF nodes 116 in order to fix discovered leakage problems permanently without impact to subscribers of the wireless communication network 100. While the techniques and configurations described herein have been primarily described with respect to PCRF node to PCRF node session discovery, the techniques and configurations described herein are applicable to other network elements (nodes) session discovery within a wireless communication network.

Figure 5:
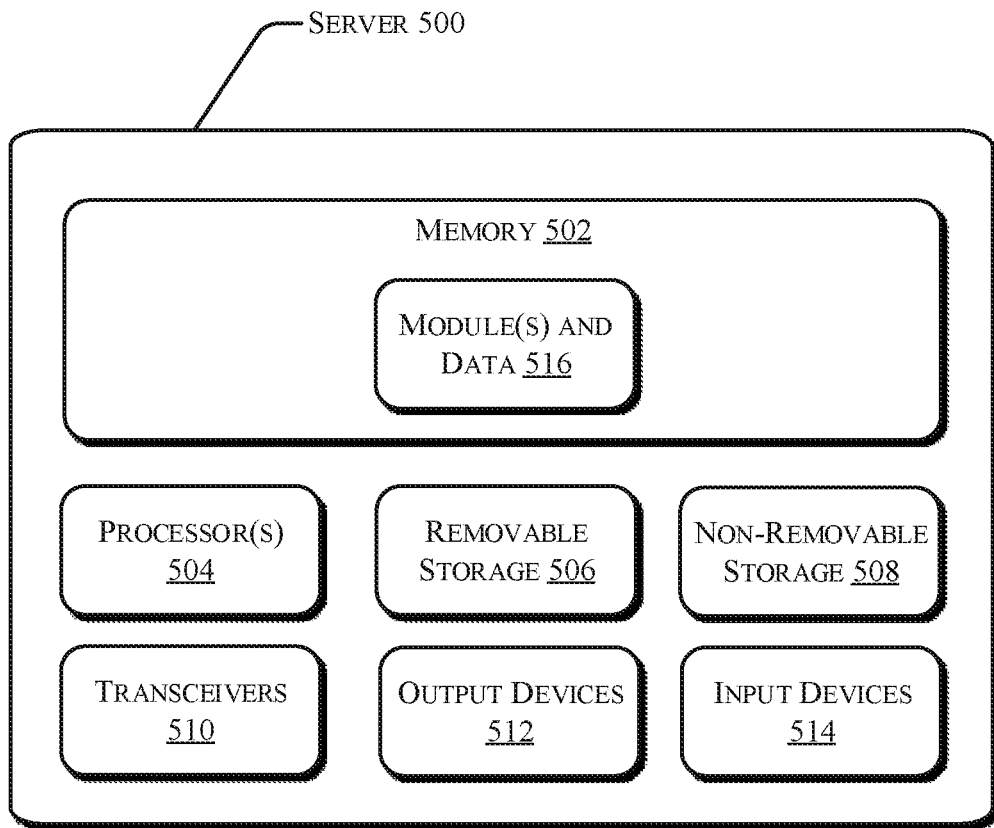
FIG. 5 schematically illustrates a component level view of a server configured for use in the arrangements of FIGS. 1 and 2 to provide various services of the wireless communication network arrangements of FIGS. 1 and 2, in accordance with various configurations.

FIG. 5 illustrates a component level view of a server configured for use within a wireless communication network, e.g., wireless communication network 100 in order to provide various services within the wireless communication network, according to the techniques described herein. The server 500 may serve as the OSS server 108 or may be located in the EPC 110. As illustrated, the server 500 comprises a system memory 502 that may store data and one or more modules and/or applications 516 for interacting with mobile devices, e.g., UEs 104, as described herein. Also, the server 500 includes processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.) or some combination of the two. In some implementations, the processor(s) 504 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead, the transceivers 510 may include wireless modem(s) to may facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A wireless communication network comprising:
   a Packet Data Network (PDN) Gateway (PGW) node configured to establish an Internet Protocol (IP) Multimedia Subsystem (IMS) registration with a first Policy and Charging Rules Function (PCRF) node;
   a Proxy-Call Session Control Function (P-CSCF) node configured to forward requests for service for voice calls over the IMS and to receive, from a mobile device within the wireless communication network, a request for IMS registration between the P-CSCF node and the mobile device; and a second PCRF node configured to receive requests for service for calls and configured to perform a Gx interface session discovery with respect to the first PCRF node,
wherein the second PCRF node is configured to perform the Gx interface session discovery based at least in part in response to receiving the request for IMS registration between the P-CSCF node and the mobile device,
wherein the second PCRF node is configured to perform the Gx interface session discovery prior to receiving the request for service for the call, and
wherein, based at least in part on the Gx interface session discovery, the PGW node is configured to establish a dedicated bearer at the first PCRF node for the call.

2. The wireless communication network of claim 1, wherein the second PCRF node is configured to perform the Gx interface session discovery with respect to the first PCRF node by:
receiving, from the P-CSCF node, a request for a Gx interface session;
at least in part in response to the request for the Gx interface session, performing, by the second PCRF node, the Gx interface session discovery with respect to the first PCRF node;
acknowledging, by the first PCRF node to the second PCRF node, successful Gx interface session discovery; and
acknowledging, by the second PCRF node to the P-CSCF, successful Gx interface session discovery.

3. The wireless communication network of claim 1, wherein the second PCRF node is configured to perform the Gx interface session discovery by sending a Gx interface session discovery message to multiple PCRF nodes within the wireless communication network, the multiple PCRF nodes including the first PCRF node.

4. The wireless communication network of claim 3, wherein the first PCRF node is further configured to, in response to receiving the Gx interface session discovery message, send a Reauthorization Request (RAR) message to the PGW node to establish the dedicated bearer at the first PCRF node for calls.

5. The wireless communication network of claim 4, wherein:
the first PCRF node is further configured to send a message to the second PCRF node acknowledging the first PCRF node as the dedicated bearer; and
the second PCRF node is further configured to forward the message to the P-CSCF node acknowledging the first PCRF node as the dedicated bearer.

6. A method within a wireless communication network, the method comprising:
establishing an Internet Protocol (IP) Multimedia Subsystem (IMS) registration between a Packet Data Network (PDN) Gateway (PGW) node and a first Policy and Charging Rules Function (PCRF) node;
receiving, by a Proxy-Call Session Control Function (P-CSCF) node from a mobile device, a request for IMS registration;
sending, by a second PCRF node, a Gx interface session discovery request to the first PCRF node, wherein the second PCRF node is configured to perform the Gx interface session discovery based at least in part in response to the P-CSCF node receiving the request for IMS registration from the mobile device;
sending, by the first PCRF node to the second PCRF node, a Gx interface session discovery success message;
sending, by the second PCRF node to the P-CSCF node, a first Authentication Authorization Answer (AAA) to complete IMS registration of the mobile device; and
forwarding, by the P-CSCF node, a request for service for a voice call over the IMS to the second PCRF node,
wherein the second PCRF node is configured to perform the Gx interface session discovery prior to receiving the request for service for the call, and
wherein, based at least in part on the Gx interface session discovery, the PGW node is configured to establish a dedicated bearer at the first PCRF node for the call.

7. The method of claim 6, further comprising:
receiving, at the second PCRF node from the P-CSCF node, the request for service for the voice call over the IMS.

8. The method of claim 6, wherein establishing a dedicated bearer at the first PCRF node for voice calls over the IMS comprises:
sending an Authentication Authorization Request (AAR) from the P-CSCF node to the second PCRF node;
forwarding the AAR from the second PCRF node to the first PCRF node;
sending a Reauthorization Request (RAR) from the first PCRF node to the PGW node;
sending a second AAA from the first PCRF node to the second PCRF node; and
forwarding the second AAA by the second PCRF node to the P-CSCF node.

9. The method of claim 6, further comprising:
sending, by the P-CSCF node to the second PCRF node, an Authentication Authorization Request (AAR),
wherein sending the Gx interface session discovery request is at least in response to sending the AAR.

10. A method within a wireless communication network, the method comprising:
establishing an Internet Protocol (IP) Multimedia Subsystem (IMS) registration between a Packet Data Network (PDN) Gateway (PGW) node and a first Policy and Charging Rules Function (PCRF) node;
receiving, by a Proxy-Call Session Control Function (P-CSCF) node from a mobile device, a request for IMS registration;
sending, by a second PCRF node, a Gx interface session discovery request to the first PCRF node, wherein the second PCRF node is configured to perform the Gx interface session discovery with respect to the first PCRF node by:
receiving, from the P-CSCF node, a request for a Gx interface session;
at least in part in response to the request for the Gx interface session, performing, by the second PCRF node, the Gx interface session discovery with respect to the first PCRF node;
receiving, from the first PCRF node, acknowledgement of successful Gx interface session discovery; and
acknowledging, by the second PCRF node to the P-CSCF, successful Gx interface session discovery; and
sending, by the second PCRF node to the P-CSCF node, a first Authentication Authorization Answer (AAA) to complete IMS registration of the mobile device.

11. The method of claim 10, wherein the request for the Gx interface session received from the P-CSCF node is an Authentication Authorization Request (AAR).

12. The method of claim 10, further comprising:
receiving, at the second PCRF node from the P-CSCF node, a request for a voice call over the IMS; and based at least in part on the request for the voice call over the IMS, establishing, by the PGW node, a dedicated bearer at the first PCRF node for voice calls over the IMS.

13. The method of claim 12, wherein establishing a dedicated bearer at the first PCRF node for voice calls over the IMS comprises:
sending an Authentication Authorization Request (AAR) from the P-CSCF node to the second PCRF node;
forwarding the AAR from the second PCRF node to the first PCRF node;
sending a Reauthorization Request (RAR) from the first PCRF node to the PGW node;
sending a second AAA from the first PCRF node to the second PCRF node; and
forwarding the second AAA by the second PCRF node to the P-CSCF node.

14. The method of claim 12, wherein the second PCRF node is configured to perform the Gx interface session discovery prior to receiving the request for the voice call over the IMS.

* * * * *